(No Model.)
G. ALLEN.
APPARATUS FOR PUMPING OIL WELLS.
No. 313,907. Patented Mar. 17, 1885.
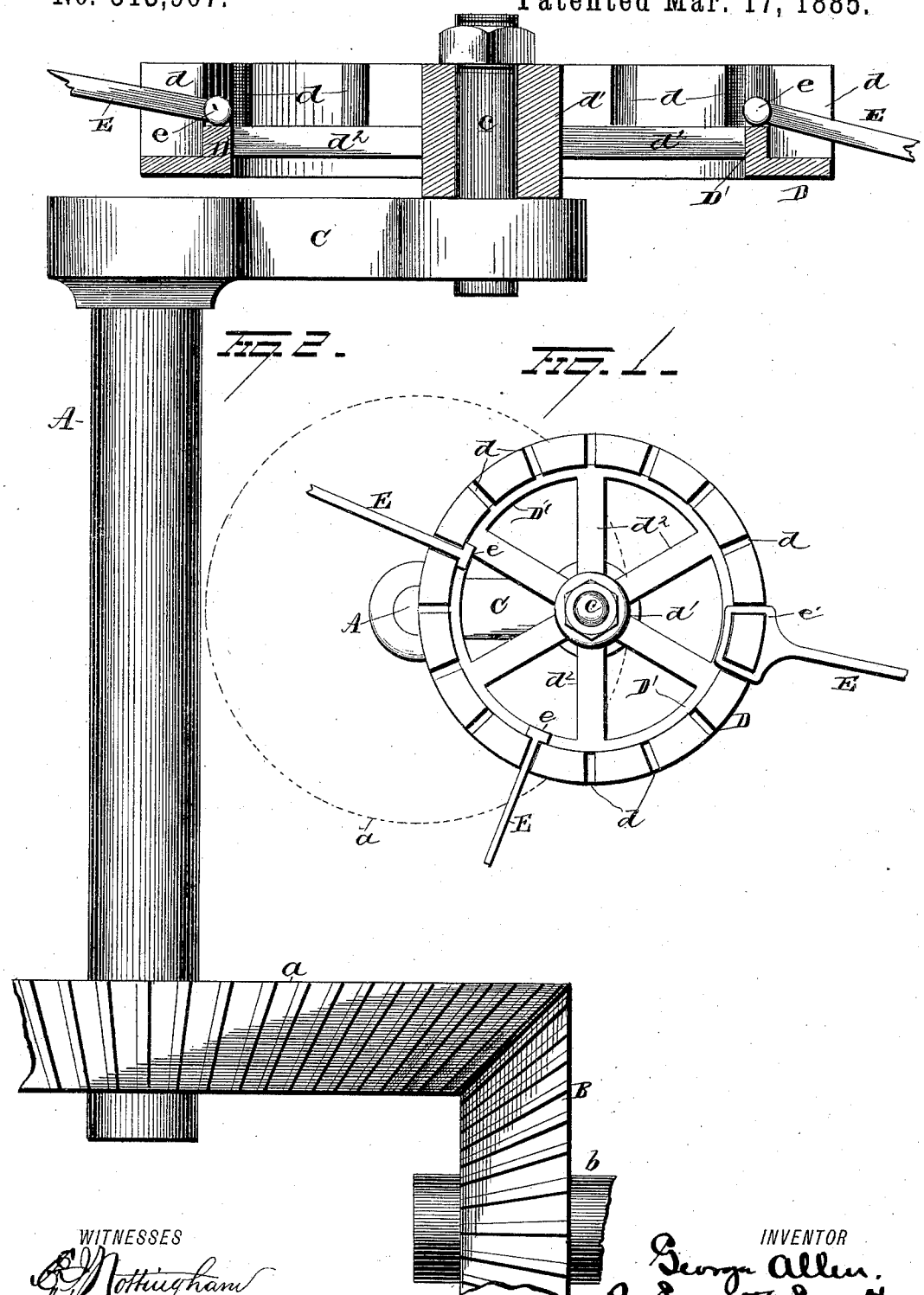
WITNESSES
INVENTOR

UNITED STATES PATENT OFFICE.

GEORGE ALLEN, OF FRANKLIN, PENNSYLVANIA.

APPARATUS FOR PUMPING OIL-WELLS.

SPECIFICATION forming part of Letters Patent No. 313,907, dated March 17, 1885.

Application filed January 13, 1885. (No model.)

*To all whom it may concern:*

Be it known that I, GEORGE ALLEN, of Franklin, in the county of Venango and State of Pennsylvania, have invented certain new and useful Improvements in Apparatus for Pumping Oil-Wells; and I do hereby declare the following to be a full, clear, and exact description of the invention, such as will enable others skilled in the art to which it appertains to make and use the same.

My invention relates to an improvement in apparatus for pumping oil-wells, the object of the same being to provide means for attaching pump-actuating rods leading in any desired direction and for actuating the same without producing an irregular strain, a further object being to provide an economical and durable apparatus; and with these ends in view my invention consists in a wheel or disk provided with a series of slots on the upper side of its rim for the attachment of pump-actuating rods.

My invention further consists in a wheel or disk adapted to the attachment of pump-actuating rods leading in different directions, and mounted on the wrist-pin of a crank secured to the end of a vertical shaft.

My invention further consists in certain features of construction and combinations of parts, as will be hereinafter described, and pointed out in the claims.

In the accompanying drawings, Figure 1 is a plan view of the wheel or disk, showing pump-rods attached thereto, and Fig. 2 is a vertical section through the shaft and wheel or disk.

A represents a vertical shaft suitably mounted, and driven by bevel-gear $a$ and B, the latter being secured on the engine-shaft $b$. The upper end of the shaft A is provided with a crank, C, having the wrist-pin $c$.

D is a wheel or disk loosely mounted on the wrist-pin $c$, and provided with a series of radial slots, $d$, which extend from the upper side of the rim nearly but not quite to the lower side.

The wheel D consists, preferably, of a hub, $d'$, a rim, D', and a series of spokes, $d^2$, connecting the hub and rim, but may be solid between the hub and rim, if found more convenient, my improvement, so far as the wheel or disk is concerned, consisting, essentially, in the series of slots or recesses formed in the upper side of the rim, as described.

The rods E, which lead from the wheel D to the pumps, and which, when reciprocated, actuate the pumps, are adapted to fit loosely in the slots $d$, and are provided with enlarged heads $e$, which prevent the rods from drawing through the slots. The rods are placed in and removed from the slots at pleasure, the only lock against vertical displacement being their weight. They are free to assume different angles in a vertical plane, and are adjusted in the most advantageous positions in a horizontal plane by placing them in their appropriate slots. As the shaft A rotates, the wheel D is caused to describe a circular path in space, and the rods, no matter in what direction they lead, are thereby reciprocated. Moreover, as the wheel D is free to rotate on its axis, the rods E adjust themselves to each new position which they are required to assume during the rotation of the shaft A.

Instead of providing the ends of the rods with enlarged heads or nuts, as shown at $e$, they may be provided with yokes, as represented at $e'$, the yokes being adapted to embrace one of the elevated sections between two successive slots.

The apparatus as thus constructed is particularly adapted to use in positions where a small number of wells are to be operated, and is capable of being set up and run at a moderate expense; but I do not wish to be understood as limiting myself to any restricted use, as it is capable of being operated upon either a grand or limited scale.

I am aware that it is not new to provide means for connecting pump-rods leading in any desired direction, and do not therefore claim the same, broadly; but, Having fully described my invention, what I claim as new, and desire to secure by Letters Patent, is—

1. In an apparatus for pumping oil-wells, the combination, with an upright shaft and a crank secured to its upper end, of a wheel or disk loosely mounted on the wrist-pin for attaching pump-actuating rods, substantially as set forth.

2. In apparatus for pumping oil-wells, the combination, with a crank secured to the upper end of an upright shaft, of a wheel or disk loosely mounted on the wrist-pin, said wheel or disk being adapted to the attachment of pump-actuating rods in any direction, substantially as set forth.

3. In apparatus for pumping oil-wells, the combination, with a crank secured to the upper end of an upright shaft, of a wheel or disk loosely mounted on the wrist-pin and provided with a series of radial slots for the attachment of pump-actuating rods in any desired direction, substantially as set forth.

4. A wheel or disk for attaching pump-actuating rods, having a series of radial slots formed in the upper side of its rim adapted to receive the ends of pump-actuating rods from any desired direction, substantially as set forth.

In testimony whereof I have signed this specification in the presence of two subscribing witnesses.

GEORGE ALLEN.

Witnesses:
H. FORBES,
G. W. BRIGHAM.